Patented Sept. 15, 1953

2,651,885

UNITED STATES PATENT OFFICE 2,651,885

METHOD OF CONDITIONING AGRICULTURAL SOIL AND GROWING PLANTS THEREIN

Ross M. Hedrick and David T. Mowry, Dayton, Ohio, assignors to Monsanto Chemical Company, St. Louis, Mo., a corporation of Delaware No Drawing. Application June 26, 1952,
Serial No. 295,844

The portion of the term of the patent subsequent to January 13, 1970, has been disclaimed and dedicated to the public 19 Claims. (Cl. 47—58)

This invention relates to methods of conditioning agricultural soils and more specifically to novel methods of developing increased aggregation of a more permanent nature in surface soils.

In abandoned applications of David T. Mowry and Ross M. Hedrick, Serial Nos. 148,521 and 148,522, filed March 8, 1950, and issued application Serial No. 271,280, filed February 12, 1952, now United States Patent No. 2,625,529, there are described and claimed classes of soil conditioning agents and methods for their use in improving yields of agricultural soils and in minimizing soil losses through erosion. The present application is a continuation-in-part of each of the said applications.

The agents which are useful in conditioning soils induce a highly aggregated condition which is more permanent than any naturally occurring soil aggregation. As a result optimum conditions for plant growth are obtained by increasing moisture content of the soil, reducing surface evaporation, increasing air excess to root structures, preventing slaking and crusting and improving drainage. At the same time the soil, and even normally heavy clay soils, retains a light porous structure and is thereafter easily cultivated.

Useful conditioning agents are the water-soluble polymeric polyelectrolytes, especially those having a weight average molecular weight of at least 10,000, and which contain substantially linear continuous carbon chains derived by the polymerization of an aliphatic unsaturated carbon to carbon double bond. The expression, "water-soluble" is intended to include compounds which form true solutions in either distilled water or in soil water, and also those which swell and become dispersed in aqueous media. The expression, "substantially linear," defines a normal polymer structure as prepared by the polymerization of a mono-olefinic monomer and possessing a minimum of cross-linking structures, which tend to render the polymer water-insoluble and reduce its effectiveness as an aggregating agent.

Suitable agents of this class are the copolymers of maleic anhydride, maleic acid, salts of maleic acid and maleic amides with any copolymerizable mono-olefinic monomer such as vinyl acetate, vinyl alkyl ethers, vinyl chloride and isobutylene, including the alkaline metal, ammonium, and alkaline earth metal salts of said copolymers. Polymers of this type include the partial calcium salts of the copolymer of vinyl acetate and maleic acid, the ammonium salts of the copolymer of isobutylene and maleic acid, and the potassium salts of a copolymer of a vinyl alkyl ether and maleic acid. Other useful polymers are the polymers of acrylic acid, methacrylic acid and derivatives thereof, such as the alkali metal salts, calcium salts, and ammonium salts, and any copolymers of the said acrylic and methacrylic acid derivatives with other monoolefinic monomers copolymerizable therewith. Typical examples of this type are polyacrylic acid, the alkali metal, ammonium and calcium salts of polyacrylic acid, the partial calcium salts, the alkali metal salts, and the ammonium salts of hydrolyzed polyacrylonitrile. A comprehensive enumeration of suitable polyelectrolytes and numerous examples of typical preparations are set forth in the application, Serial No. 271,280, filed February 12, 1952, by David T. Mowry and Ross M. Hedrick, now issued as United States Patent No. 2,625,529.

The practice of the present invention involves an exceptionally efficient means of applying the useful polymers in the form of dilute aqueous solutions. In this manner a very uniform concentration of polymer can be applied to greenhouse benches or small gardens. If desired, the soil in the immediate area of the growing plant, or along a row of plants, may be conditioned without using polymer to condition soil where the conditioning agent will yield no beneficial result. Where the solid polymers are used it is generally necessary to treat the entire field with a vigorous overall mixing operation, for example by disking or other harrowing procedures. Such procedures are not adaptable to spot or row treatments, because the treated areas are often not readily ascertainable for subsequent planting, and obviously not usable after the seeds or plants have been established. Additions of top dressings of polymer are often not successful, because the optimum aggregations throughout the soil in contact with the plant roots is not possible, due to the high concentration at the surface of the soil and because dissolution of the polymer in soil water is often delayed by the gellation of the polymer.

It has been found that dilute solutions, for example 0.001 to 25 per cent of polymer in water may be used to condition soils. For effective use it is necessary for this solution to have a low viscosity for rapid penetration into the soil so that the polymers will be carried immediately through the soil interstices to lower levels. Accordingly, for solutions of high molecular weight polyelectrolytes which manifest greater viscosities lower concentrations will be necessary. In the use of solutions to condition soils the depth of penetration may be controlled by regulating the viscosity of the solution, the quantity of the solution applied and the depth of cultivation prior to application. Obviously low viscosities, more dilute solutions, and deeper soil bed preparation promote the rapid transfer of the polymer to the lower levels. The quantity of solution used may be sufficient to establish in the soil from 0.001 to 1.0 per cent throughout the soil which will become contacted with the plant roots but usually not beyond the depth of cultivation. Generally the surface areas will retain larger quantities of the polymers with a greater reduction in concentration as the lower soil bed levels are reached. There appears to be a saturation value for most soils and if this polymer retention value is reached in the upper layers more of the polymer will penetrate to treat the deeper soil levels.

For the optimum conditioning effects the soil should be cultivated to the desired depth prior to the polymer solution addition. In general the depth of cultivation will depend upon the root depth of the contemplated crop. Usually the ordinary plowing and harrowing operations will provide a bed of suitable depth. The effectiveness of treatment will also depend to some extent upon the extent of comminution, both the larger particles and the smaller particles sizes are undesirable. Optimum size for aggregates is from two mm. to five mm. The soil preparation operations produce an aggregated soil with adequate air interstices and with other properties of good aggregated soils, but in which the individual aggregates are not stable to water and will become slaked or eroded by rainfall or surface water. The unstable soil aggregates when contacted with dilute solutions of the polyelectrolytic polymers absorb the solution and are immediately and permanently stabilized to the normal slaking and eroding action of rainfall and surface water.

Accordingly, the preferred practice of this invention involves the initial preparation of aggregates in the soil by the cultivation followed by treatment with the aqueous polymer solution. Preferred agricultural procedures involve the placing of a living plant structure, for example a seed, a cutting, a tuber, a bulb, or a rooted plant, either prior to the polymer addition or immediately subsequent to the treatment. The simplest and most preferred procedure of this invention involves cultivating the soil to form a finely divided soil bed, the insertion of the living plant structure, the distribution of the soil over and around the said living plant structure, and finally the pouring, spraying, sprinkling, or other deposition of the aqueous polymer solution in the vicinity of the plant structure. The polymer solution flows through the soil interstices and diffuses into the individual unstable aggregates. The polymer molecules become absorbed into the soil aggregates and each bind several of the ultimate soil particles into a permanent but non-rigid structure. The composite soil does not become rigid as would be expected from normal resin treatment of a soil but is spongy and has all of the desirable aspects of fertile soils.

Further details of the invention are set forth with respect to the following specific examples:

EXAMPLE 1

Radishes were grown in greenhouse flats in untreated Miami silt loam soil and in the soil treated with polymers mixed in solid state, by spraying and by pouring the solution on the surface of the soil. In some instances mechanical mixing or aggregation was used. The following table sets forth the yield factors observed.

Table

| Polymer | Conc. in Soil | Treatment | Yield Factor | Water-Stable Aggregates, 0.25 mm. |
|---|---|---|---|---|
| Ammonium salt of copolymer of isobutylene and maleic acid. | 0.005 | solution poured on without mixing. | 1.32 | 67 |
| Do | 0.01 | ___do___ | 1.29 | 69 |
| Do | 0.01 | solution poured on with subsequent mixing. | 1.39 | 88 |
| Do | 0.005 | ___do___ | 1.49 | 78 |
| Do | 0.05 | sprayed on from solution. | 1.32 | |
| Do | 0.01 | solid polymer addition. | 1.18 | 74 |
| Do | 0.02 | ___do___ | 1.21 | 83 |
| Hydrolyzed polyacrylonitrile (sodium salt). | 0.05 | solution poured on without mixing. | 1.60 | 75 |
| Do | 0.05 | solid polymer addition. | 1.27 | 77 |
| Control (5 flats) | | | 1.0 | 48 |

EXAMPLE 2

Moist Miami silt loam soil was run through a soil shredder to break up the lumps and placed in pots, one pound per pot. Dilute aqueous solutions of hydrolyzed polyacrylonitrile (sodium salt) was poured over the soil. One hundred milliliters of solution was sufficient to soak all of the soil. The water stability of the soil aggregates was determined by wet-sieving. The porosity of the undisturbed soil to percolating water was determined after the soil had been allowed to dry. The following table shows the aggregation and percolation data observed.

Table

| Treatment | Rate of Polymer to Soil | Water-Stable Aggregates, >0.25 mm., ave.—3 pots | Time Required for 400 ml.H₂O to Soak Into Soil |
|---|---|---|---|
| | | | Min. |
| 100 ml. H₂O | None | 38 | 75 |
| 100 ml. 0.25% Polymer solution. | 0.05% | 71 | 7.7 |
| 100 ml. 0.5% Polymer solution. | 0.1% | 79 | 3.3 |

The wet-sieving technique used to measure the water-stability of the aggregates in the soil is a standard procedure described in detail in copending application, Serial No. 271,280, filed February 12, 1952, now issued as United States Patent No. 2,625,529.

What we claim is:

1. The method of growing plants which comprises establishing a living plant structure in a soil previously aggregated by mechanical cultivation and thereafter stabilizing the pre-formed aggregates by contacting therewith a water solution of a polymeric polyelectrolyte having a weight average molecular weight of at least 10,000, and a substantially linear structure derived by the polymerization of a monoolefinic compound through the aliphatic unsaturated group.

2. The method of growing plants, which comprises forming unstable aggregates in agricultural soil by cultivation, establishing in the soil a living plant structure and thereafter stabilizing the pre-formed aggregates by contacting them with a water solution of a polymeric polyelectrolyte having a weight average molecular weight of at least 10,000 and a substantially linear structure derived by the polymerization of a monoolefinic compound through the aliphatic carbon to carbon double bond.

3. The method of growing plants which comprises forming unstable aggregates in agricultural soil by cultivating, stabilizing the pre-formed aggregates by contacting therewith a water solution of a polymeric polyelectrolyte having a weight average molecular weight of at least 10,000, and a substantially linear structure derived by the polymerization of a monoolefinic compound through the aliphatic carbon to carbon double bond, and thereafter establishing in the conditioned soil a living plant structure.

4. The method of growing plants which comprises establishing a living plant structure in a soil previously aggregated by mechanical cultivation and thereafter stabilizing the pre-formed aggregates by contacting therewith a water solution containing dissolved therein from 0.001 per cent to 25 per cent of a polymeric polyelectrolyte having a weight average molecular weight of at least 10,000, and a substantially linear structure derived by the polymerization of a monoolefinic compound through the aliphatic carbon to carbon double bond.

5. The method of growing plants, which comprises forming unstable aggregates in agricultural soil by cultivation, establishing in the soil a living plant structure and thereafter stabilizing the pre-formed aggregates by contacting them with a water solution containing dissolved therein from 0.001 per cent to 25 per cent of a polymeric polyelectrolyte having a weight average molecular weight of at least 10,000, and a substantially linear structure derived by the polymerization of a monoolefinic compound through the aliphatic carbon to carbon double bond.

6. The method of growing plants which comprises forming unstable aggregates in agricultural soil by cultivating, stabilizing the pre-formed aggregates by contacting therewith a water solution containing dissolved therein from 0.001 to 25 per cent of a polymeric polyelectrolyte having a weight average molecular weight of at least 10,000 and a substantially linear structure derived by the polymerization of a monoolefinic compound through the aliphatic carbon to carbon double bond, and thereafter establishing in the conditioned soil a living plant structure.

7. The method of growing plants which comprises establishing a living plant structure in a soil previously aggregated by mechanical cultivation and thereafter stabilizing the pre-formed aggregates by contacting therewith a water solution of a polymeric polyelectrolyte having a weight average molecular weight of at least 10,000, and a substantially linear structure derived by the polymerization of a monoolefinic compound through the aliphatic carbon to carbon double bond, said solution being sufficient to introduce into the soil from 0.001 to 1.0 per cent of the polymer based upon the weight of the soil treated.

8. The method of growing plants which comprises establishing a living plant structure in a surface soil subject to slaking and erosion which soil has been previously cultivated to form unstable aggregates and subsequently to the cultivation stabilizing the aggregates by contacting them with a water solution of a synthetic water-soluble polymeric polyelectrolyte containing a substantially linear structure derived by the polymerization of a monoolefinic compound through aliphatic carbon to carbon unsaturation and having a molecular weight such as to improve the water-stability of the aggregates in the said soil.

9. The method of growing plants in soil which normally tends to slake and erose, which comprises establishing a living plant structure in a soil which has previously been cultivated to form unstable aggregates, and subsequently to the cultivation stabilizing the aggregates by contacting them with a water solution of a high molecular weight polymer containing a substantially linear structure derived by the polymerization of a monoolefinic compound through the unsaturated group, and having a number of ionizable substituents such as to render the polymer water-soluble thereby improving the water-stability of the aggregates in the soil.

10. The method defined by claim 1 wherein the polyelectrolyte is a calcium salt of a hydrolyzed polymer of acrylonitrile.

11. The method defined by claim 1 wherein the polyelectrolyte is a sodium salt of a hydrolyzed polymer of acrylonitrile.

12. The method defined by claim 1 wherein the polyelectrolyte is a copolymer of vinyl acetate and the reaction product formed by partially esterifying maleic anhydride with methyl alcohol.

13. The method defined by claim 1 wherein the polyelectrolyte is an ammonium salt of the copolymer of isobutylene and maleic acid.

14. The method defined by claim 1 wherein the polyelectrolyte is a calcium salt of the copolymer of vinyl acetate and maleic anhydride.

15. The method defined by claim 7 wherein the polyelectrolyte is a calcium salt of a hydrolyzed polymer of acrylonitrile.

16. The method defined by claim 7 wherein the polyelectrolyte is a sodium salt of a hydrolyzed polymer of acrylonitrile.

17. The method defined by claim 7 wherein the polyelectrolyte is a copolymer of vinyl acetate and the reaction product formed by partially esterifying maleic anhydride with methyl alcohol.

18. The method defined by claim 7 wherein the polyelectrolyte is an ammonium salt of the copolymer of isobutylene and maleic acid.

19. The method defined by claim 7 wherein the polyelectrolyte is a calcium salt of the copolymer of vinyl acetate and maleic anhydride.

ROSS M. HEDRICK.
DAVID T. MOWRY.

References Cited in the file of this patent

UNITED STATES PATENTS

| Number | Name | Date |
|---|---|---|
| 2,582,194 | Dudley | Jan. 8, 1952 |
| 2,625,471 | Mowry | Jan. 13, 1953 |
| 2,625,529 | Hedrick | Jan. 13, 1953 |

OTHER REFERENCES

"The New Garden Encyclopedia," published 1941 by Wm. H. Wise & Co., N. Y., page 1233.

Taylor, "Encyclopedia of Gardening," published 1948 by Houghton Mifflin Co., Boston, page 1120.